United States Patent [19]

Calle et al.

[11] 3,742,457

[45] June 26, 1973

[54] HIGH SPEED DATA TRANSFER FOR A PERIPHERAL CONTROLLER

[75] Inventors: Jaime Calle, Glendale; Richard Thomas Flynn; Marion Gene Porter, both of Phoenix, all of Ariz.

[73] Assignee: Honeywell Information Systems Inc., Waltham, Mass.

[22] Filed: May 15, 1972

[21] Appl. No.: 260,336

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,597,743 | 8/1971 | Murphy et al. | 340/172.5 |
| 3,573,740 | 4/1971 | Berger et al. | 340/172.5 |
| 3,643,223 | 2/1972 | Ruth et al. | 340/172.5 |
| 3,673,576 | 6/1972 | Donaldson | 340/172.5 |
| 3,573,741 | 4/1971 | Gavril | 340/172.5 |
| 3,559,184 | 1/1971 | Rawlings et al. | 340/172.5 |
| 3,541,513 | 11/1970 | Paterson | 340/172.5 |

*Primary Examiner*—Paul J. Henon
*Assistant Examiner*—Mark Edward Nusbaum
*Attorney*—Dudley T. Ready, Edward W. Hughes et al.

[57] ABSTRACT

A microprogrammable controller is provided which has the capability of transmitting and receiving data simultaneously. This effectively doubles the transmission rate as compared with alternating receiving and transmitting operations. Special features are incorporated in a microprogrammable controller, having arithmetic and logical data processing capability, in order to support these functions. Furthermore, the transfer functions can be combined with a read/write memory function.

6 Claims, 11 Drawing Figures

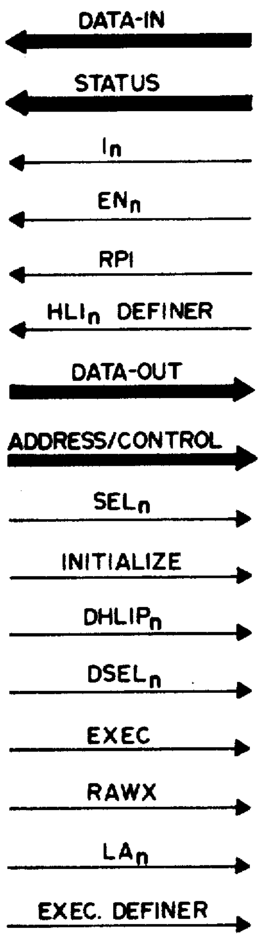
FIG. 8
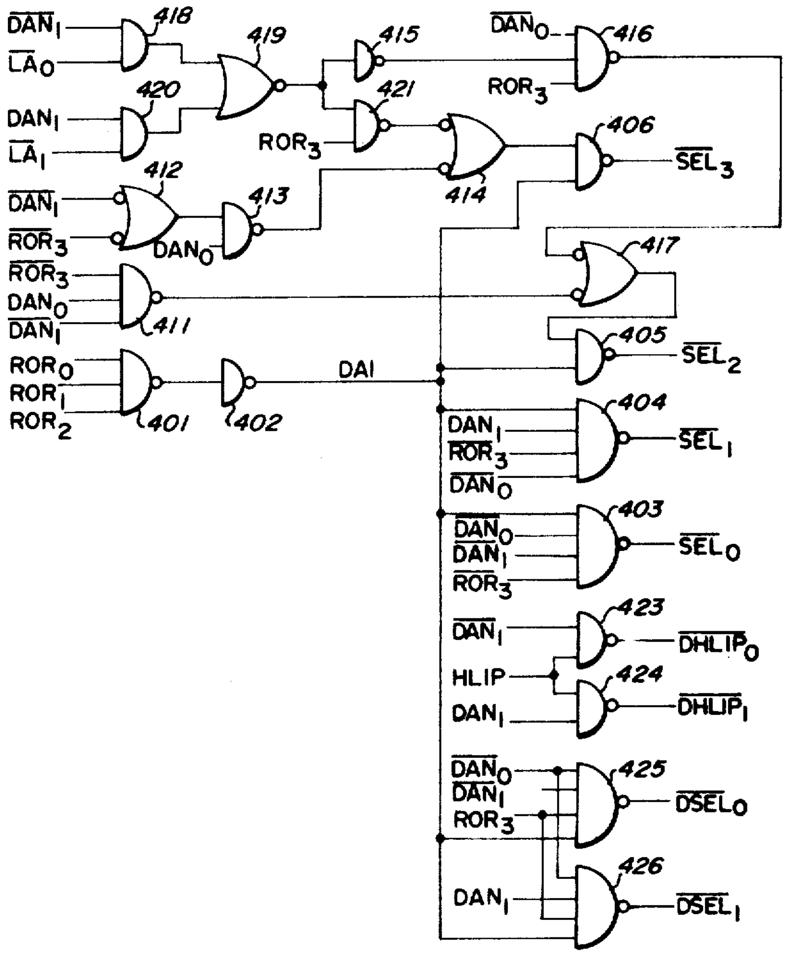
FIG. 7
ADAPTOR SERVICE
| 0 | 1 | 2 | 3 | 4 | 5 | 6–7 | 8–15 |
|---|---|---|---|---|---|---|---|
| 1 | 1 | 1 | D/L | RPI | N/S | ACC | LITERAL |
MEMORY CYCLE DEFINER
| 0 | 1 | 2 | 3 | 4–7 | 8–9 | 10 | 11 | 12–13 | 14–15 |
|---|---|---|---|---|---|---|---|---|---|
| 1 | 0 | 0 | 0 | N | REG. | D | 0 | Z, OS | W/R |
FIG. 9

HIGH SPEED DATA TRANSFER FOR A PERIPHERAL CONTROLLER

FIELD OF THE INVENTION

This invention relates to microprogrammable peripheral controllers for use in digital computer subsystems.

BACKGROUND OF THE INVENTION

The data transfer rates at which high performance peripheral devices such as disk and tape units can operate can be as high as several hundred thousand bytes per second or higher. When such data transfers pass through a microprogrammable peripheral controller, minimizing the microprogram routine overhead for controlling the data transfer is essential in order to avoid data losses. A data transfer involves the transfer of data into one controller I/O port, out another I/O port, and the performance of the controller functions. It is accordingly a primary object of the invention to minimize the overhead for peripheral data transfers.

SUMMARY OF THE INVENTION

A microprogrammable controller is provided which normally has two I/O link adaptor ports assigned to communication with a central processor and has two I/O controller adaptor ports assigned to communicate with peripheral devices. A control register is set to associate a link adaptor port with each controller adaptor port. Furthermore, an adaptor number register, settable in response to adaptor port interrupt signals, determines the adaptor port number to be serviced. Also provided is logic responsive to the state of the controller register, the adaptor number register and an adaptor interface service microinstruction such that one adaptor port is selected to receive data and a second adaptor port is selected to transmit data during the execution of a single microinstruction. In addition, these transfer functions may be combined with read/write operations with main memory.

BRIEF DESCRIPTION OF THE DRAWINGS

FIG. 7 is a logic diagram for adaptor port selection.

FIG. 8 is a diagram of the device adaptor port interface.

FIG. 9 shows the formats for memory cycle and device adaptor port service microinstructions.

DESCRIPTION OF THE PREFERRED EMBODIMENT OF THE INVENTION

Figure 1:
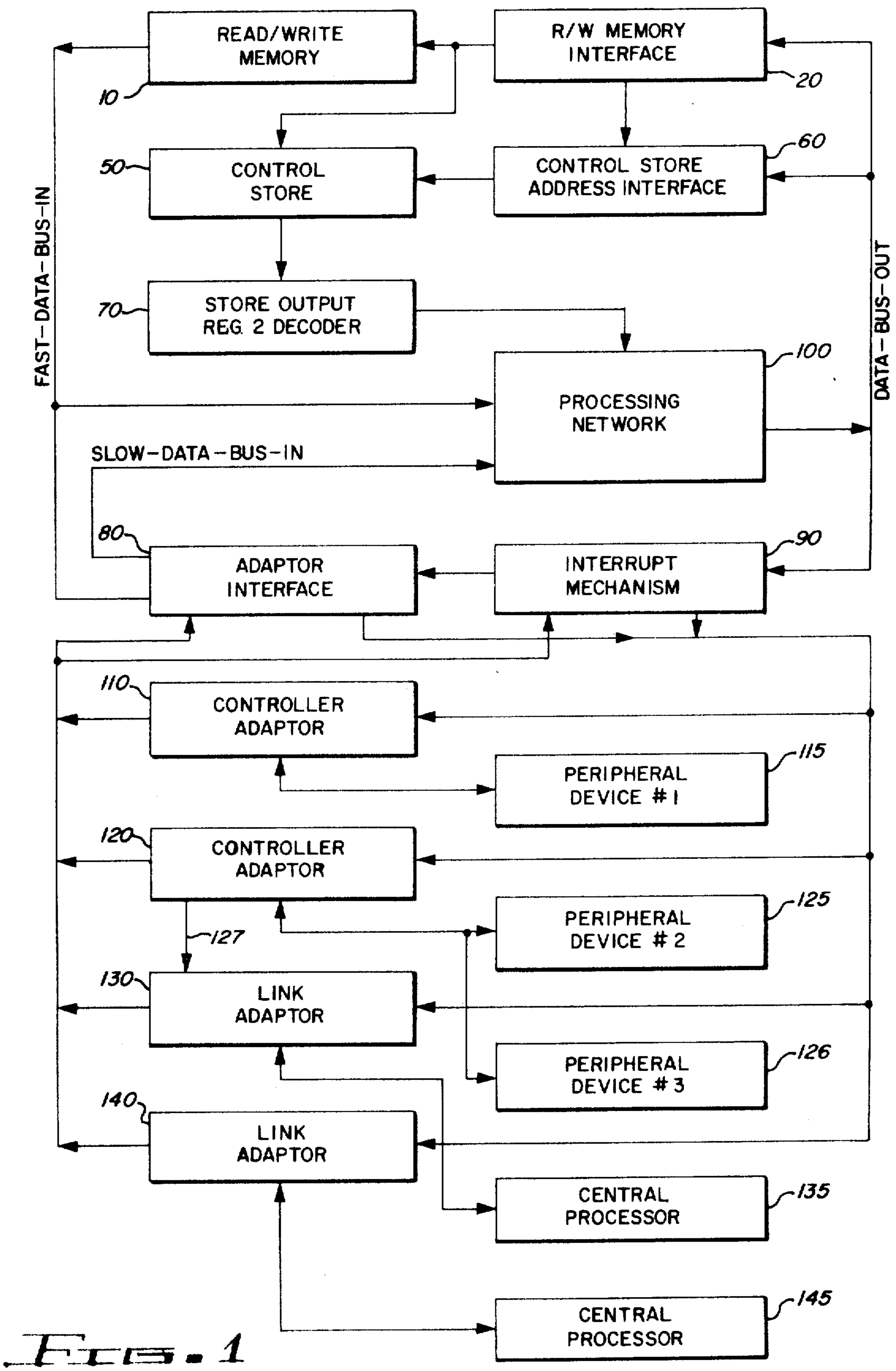
FIG. 1 is a block diagram of a representative peripheral subsystem incorporating a peripheral controller in accordance with the present invention.

FIG. 1 is a block diagram of a representative peripheral subsystem in which a set of peripheral devices 115, 125 and 126 are connected to a pair of central processor ports 135 and 145. The connections are through a microprogrammable controller which includes a processing network 100, for performing logical, arithmetic and data transfer operations; a control store 50 containing sets of microinstructions, providing programs for data transfers and peripheral device control; a control store output register (ROR) and decoder 70, which receive microinstructions; and a common adaptor interface 80. Controller adaptors 110 and 120 are provided to interconnect the common adaptor interface and the peripheral devices 115, 125 and 126. Similarly, link adaptors 130 and 140 interconnect the common adaptor interface and the central processor ports 135 and 145. The controller further includes a control store address interface 60, which includes a control store address register (ROSAR), and is connected to the data-bus-out from the processing network 100. In addition, a read/write memory 10 is generally necessary for efficient controller operation. This memory is serviced by the read/write memory interface 20, which is also connected to the processing network data-bus-out. Preferably, control store 50 has a writable portion of at least 512 microinstructions, which is also served by the memory interface 20. An interrupt mechanism 90 is responsive to signals from the adaptors, under the control of the data-bus-out signals. The operand inputs for the processing network 100 are provided by the slow and fast-data-bus-in from the adaptor interface 80 and the read/write memory 10.

The FIG. 1 peripheral subsystem is representative in that various combinations of controller adaptors and link adaptors are possible, even a stand-alone configuration with one or more controller adaptors may be useful. However, the most common configuration would be a single link adaptor and a single controller adaptor for a set of disk units or a set of tape units. Dual channel operation is enabled by a second link adaptor.

Figure 2:
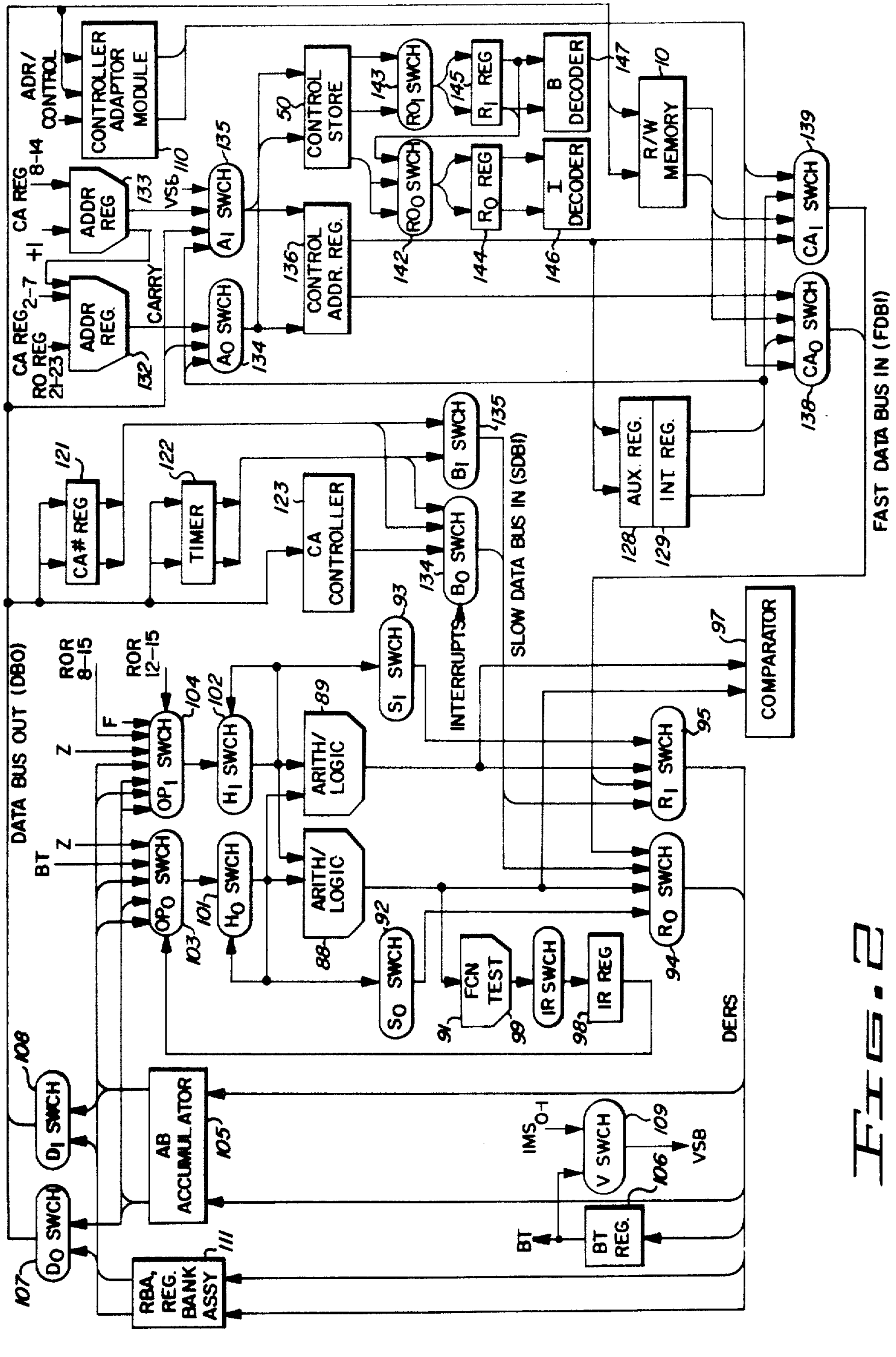
FIG. 2 is a block diagram showing the peripheral controller in greater detail.

The primary data paths for the microprogrammable controller portion of FIG. 1 are shown in greater detail in FIG. 2. In order to minimize costs, it is preferable to use standard logic modules. Unless otherwise indicated, the registers are implemented with J-K flip-flops and the switches are 1 of *n* select switches, where $n =$ 2, 4 or 8, according to the number of switch inputs. In FIG. 2, a pair of redundant arithmetic/logic units 88 and 89 enable either error detection by comparator 97 for functions of a pair of byte operands or as a transfer path for a word transfer operation. The operands are selected by $OP_0$ and $OP_1$ switches 103 and 104. $H_0$ and $H_1$ switches 101 and 103 are interposed between the OP switches and the arithmetic/logic units in order to insure proper inputs to the adder/logic units when the outputs are stored in one of the operand registers, or AB accumulator 105. In addition to the adder/logic functions, shifts left or right by one bit are performed by $S_0$ and $S_1$ switches 92 and 93. The $R_0$ and $R_1$ result switches 94 and 95 provide inputs to the branch test register 106, the register bank assembly 111 and the AB accumulator. The $R_0$ and $R_1$ switches select the adder/logic output or the S switches or one of the data busses, fast-data-bus-in, FDBI, or slow-data-bus-in, SDBI, thereby producing a function network output $DERS_{0-15}$. $D_0$ and $D_1$ switches 107 and 108 selectively connect the AB accumulator or the register bank assembly to the data-bus-out, DBO. A function test generator 91 generates four indicator bits, such as carry and zero, which are selectively applied to either the upper or lower half of indicator register 99 through switch 98.

In FIG. 2, the data-bus-out (DBO) is made available to the controller adaptor module 110, the controller number register 121, the timer 122 and the control register 123. All of these elements, except module 110, are connected to the slow-data-bus (SDBI) through $B_0$ and $B_1$ switches 124 and 125, and are thereby made available to the FIG. 2 processor portion.

FIG. 2 also shows the primary data paths for the microinstruction processing. Address adders 132 and 133 either increment the current microinstruction address by two for the control store 50 or change the address in accordance with certain branch microinstructions. The resulting address or another address is selected by $A_0$ and $A_1$ switches 134 and 135 and applied to control store 50 and the control store address register 136. Pairs of microinstructions are transferred to the $RO_0$ and $RO_1$ control store output registers 144 and 145 through $RO_0$ and $RO_1$ switches 142 and 143. Alternatively, the $RO_0$ switch transfers the microinstruction from the $RO_1$ register to the $RO_0$ register. The $RO_1$ register can also selectively receive the output of the function network output $DERS_{0-15}$ through the $RO_1$ switch. Instructions, other than branch instructions, are decoded by the I general purpose decoder 146 and branch instructions are decoded by the B branch decoder 147. These decoders are responsive to the contents of the $RO_0$ and $RO_1$ registers, respectively. The controller registers AUXAR 128, INTAR 129 and ROSAR 136, together with the inputs from the controller adaptor module and the read/write memory data are made available to the processing structure over the fast-data-bus-in (FDBI) through $CA_0$ and $CA_1$ switches 138 and 139.

The AI adaptor port interface for the controller adaptor 110 is comprised of common sets of lines for data-in, data-out, address/control, status and miscellaneous control. In addition to these lines, the AI includes for each adaptor, lines for an interrupt, adaptor selection, event notification, and a raw clock. Both the data-in and data-out line sets are 16 bits wide, primarily to support two byte wide data transfer so as to enable doubling the data transfer rate over a single byte transmission rate. The address/control lines direct a command to the adaptor in order to change the condition of the adaptor or to define the nature of a concurrent data transfer. The status lines convey information on the condition of the adaptor to the processing unit. The miscellaneous control lines perform functions such as data strobe, response-in (RPI) and initialize. These connections, not including parity, are listed as follows:

| DAI Connections | No. of Lines | To/From Adaptor |
|---|---|---|
| data-out | 16 | to |
| data-in | 16 | from |
| address/control | 8 | to |
| status | 4 | from |
| raw clock | 1 | to |
| run clock definer | 1 | to |
| interrupt | 1 per adaptor | from |
| event notification | 1 per adaptor | from |
| select | 1 per adaptor | to |
| response in (RPI) | 1 per adaptor | from |
| initialize | 1 per adaptor | to |
| control reset | 1 per adaptor | to |
| operational out | 1 per adaptor | to |
| LA selected | 1 per adaptor (ports 0–1) | to |
| operational in | 1 per adaptor | from |
| LA definer | 1 per adaptor (ports 0–1) | to |
| execution clock | 1 per adaptor | to |
| high level int. in progress | 1 per adaptor (ports 0–1) | to |
| interrupt definer | 1 per adaptor | from |

Figure 4A:
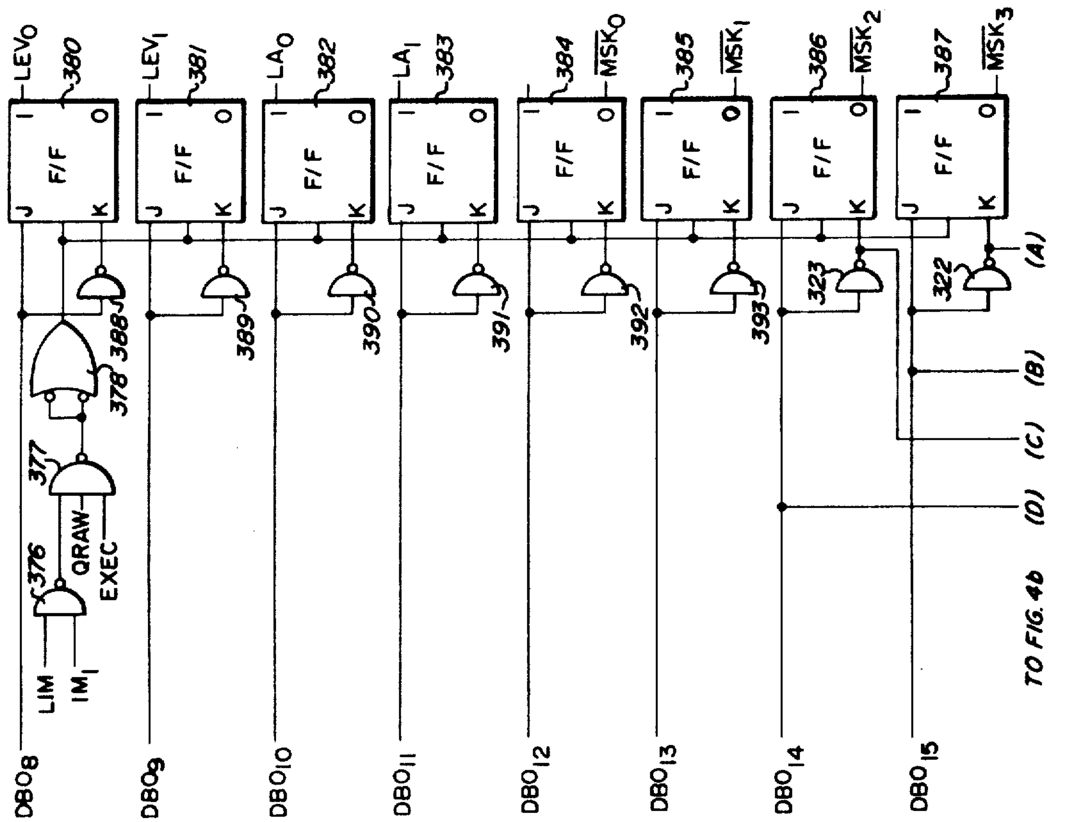
Figure 4B:
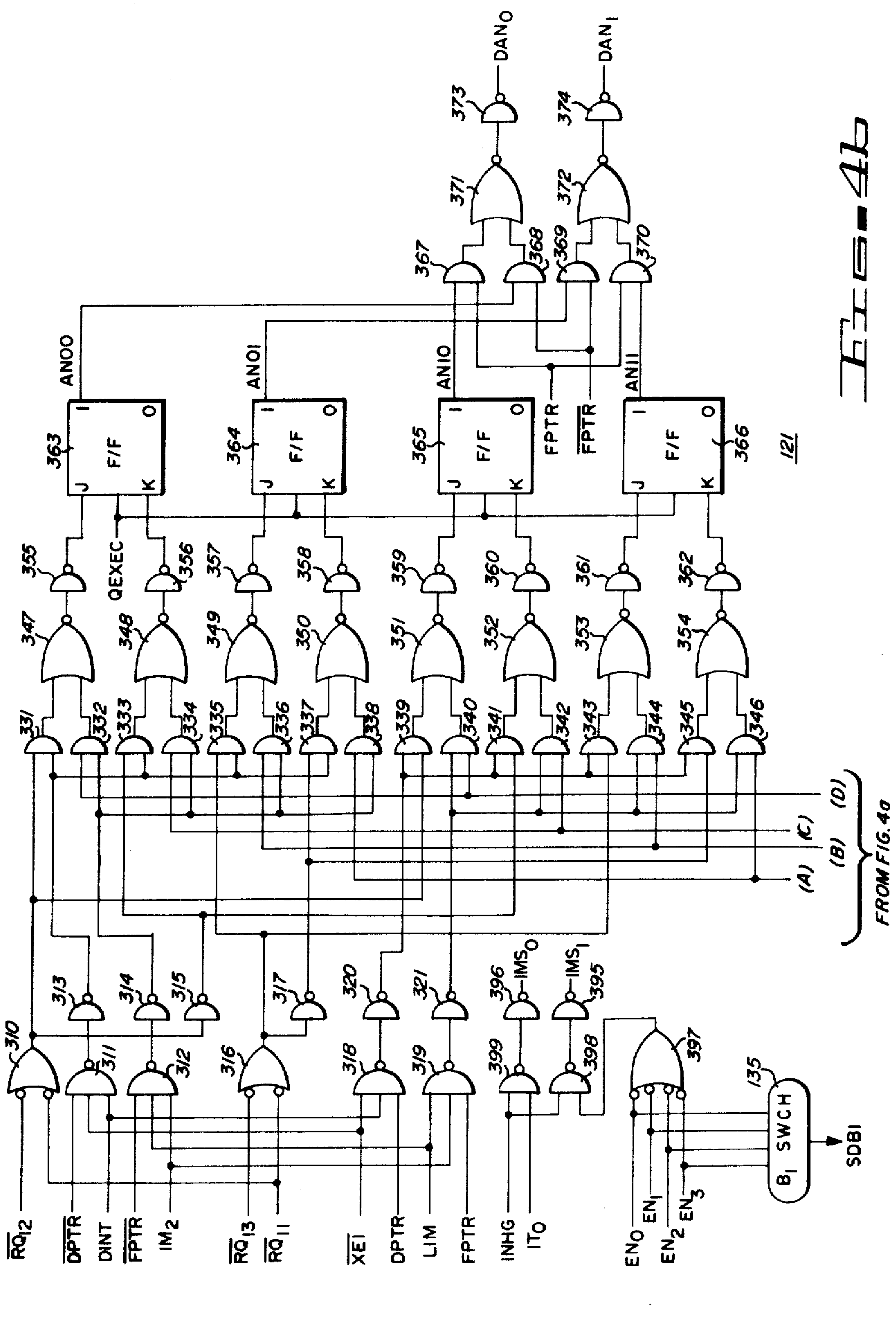

The set of working registers, AB accumulator 105, register bank assembly 111, branch test register 106, indicator registers 98, AUXAR 128, INTAR 129, and the adaptor number register 121 are duplicated. FIG. 4*b* shows an example of the duplication and how the current working register is selected. For further details of the construction of the processor, not pertinent to the present invention, reference is made to the copending application, "Microprogrammable Peripheral Controller", Ser. No. 240,064, filed by the undersigned Mar. 31, 1972.

Figure 5:
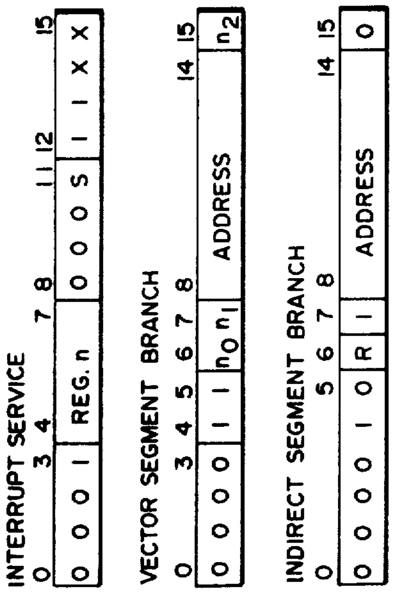
FIG. 5 shows the formats of the microinstructions essential to the interrupt functions.

Three types of microinstructions are provided for interrupt mechanism services, all of which have 0001 in the four most significant bits, indicating that a word transfer operation is specified, and have the format shown in FIG. 5. The types of operations are specified by the last four bits which are as follows:

1101: change interrupt mechanism conditions (CIM)

1110: store interrupt mechanism register (SIM)

1111: load interrupt mechanism register (LIM)

These operations types are decoded by the general instruction decoder 146 of FIG. 2. The register or control flip-flop affected is specified by bits 4–7. For example, the adaptor control register 123 and the adaptor number register 121 are respectively represented by 0001 and 0010 for both the SIM and LIM types of microinstructions. Also, 0111 specifies the DUAL flip-flop for the CIM type of microinstruction. Bits 4–7 are decoded by the binary to one of ten converter 245 in FIG. 3*b*. Bit 11 specifies a set or reset function for the CIM type of microinstruction.

Figure 3A:
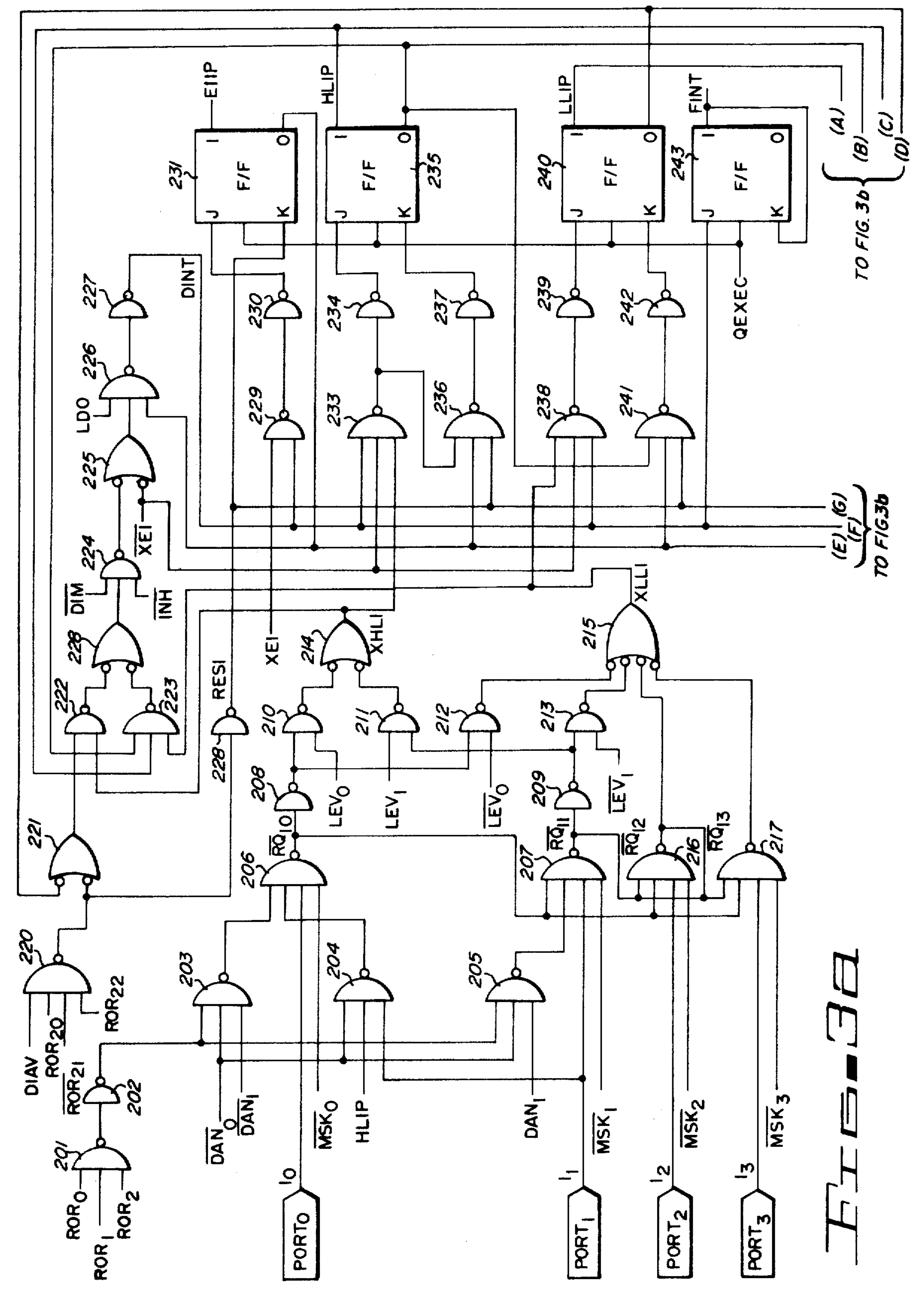
FIGS. 3*a*, 3*b*, 4*a*, and 4*b* are logic diagrams illustrating the interrupt mechanism of the controller processor.
Figure 3B:
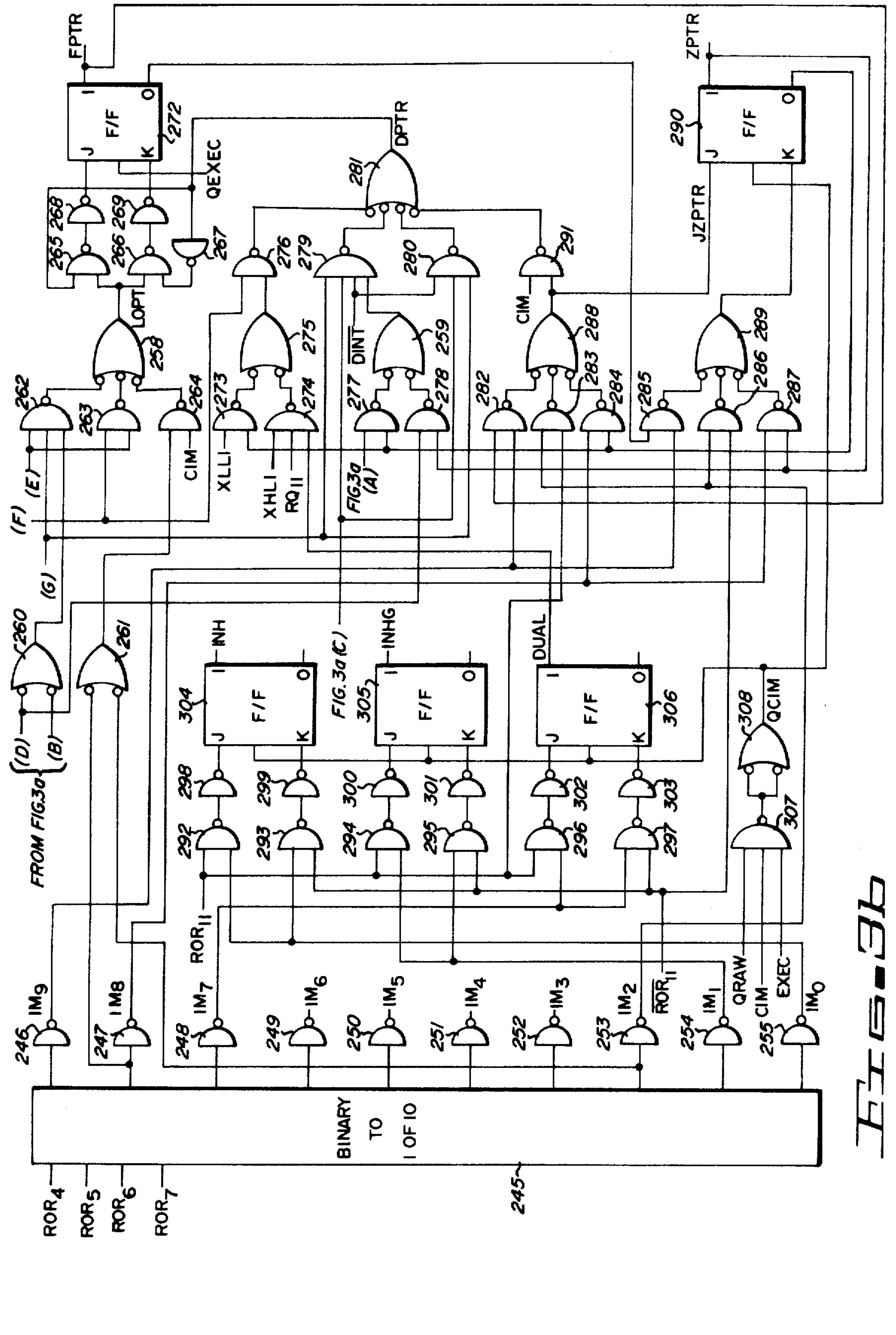

FIGS. 3*a*, 3*b*, 4*a* and 4*b* show the basic logic for implementing the desired essential interrupt functions. In FIG. 3*a*, gates 201–217 establish the priority of interrupt requests from adaptor ports 0-3 which have respective interrupt request signals $I_{0-3}$ on the adaptor interface, AI. These gates generate four priority signals $\overline{RQ}_{10-13}$, the respective outputs of gates 206, 207, 216 and 217, which at most have one of these signals at a logical zero level, indicating a port interrupt request to be serviced. For $\overline{RQ}_{10}$, signals from the control store output register 144 of FIG. 2 (the first three bits of the microinstruction, $ROR_{0-2}$) are checked by NAND gates 201 and 202 which produce a logical one if and only if all the input bits are ones, indicating an adaptor interface service microinstruction is in execution. If the output of gate 202 is a one and the adaptor number register 121 is selecting the first port adaptor ($DAN_0 = 0 = DAN_1$), a priority request from the first controller adaptor is inhibited by gate 203. A priority request is also inhibited by gate 204 if a high level interrupt is in progress (HLIP = 1) if the second controller adaptor interrupt signal is up (i.e., $I_1 = 1$), and if that controller adaptor is selected ($\overline{DAN}_1 = 0$). Otherwise, the priority of the first port is established, $\overline{RQ}_{10} = 0$, unless masked ($\overline{MSK}_0 = 0$). The second priority request, $RQ_{11} = 0$, is inhibited by gate 205, if an AI service microinstruction is in execution (gate 202 output is a one) and the adaptor number register 121 selects port 1, $\overline{DAN}_0 = 1$ and $DAN_1 = 1$. Gates 214 and 215 produce signals XHLI and XLLI which represent high and low level interrupt priorities respectively. The primary priority criterion is the port number, with port 0 having the highest priority and port 3 the lowest. Accordingly, the gates are connected to provide this relationship. For example, $\overline{RQ}_{10}$ is an inhibiting input to gates 207, 216 and 217, so that these gates are inhibited from producing a zero output when $\overline{RQ}_{10} = 0$. Similar inhibiting connections are made with $\overline{RQ}_{11}$ and $\overline{RQ}_{12}$. The four low order bits of controller register 123 $MSK_{0-3}$ selectively inhibit $\overline{RQ}_{10-13}$ respectively when set. This provides a programmable interrupt mask which is implemented with the controller register's flip-flops 384–387, FIG. 4*a*. Gates 210–215 determine if a high or low priority request is present. $LEV_0$ and $LEV_1$ are provided by the first two bits of control register 123.

Figure 6:
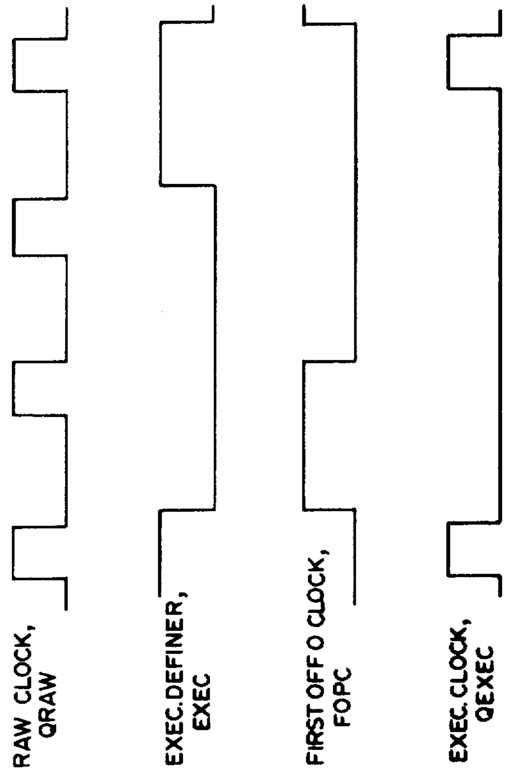
FIG. 6 is a timing diagram illustrating the control signals for the controller.

$XHLI = RQ_{10} \cdot LEV_0 + RQ_{11} \cdot LEV_1$ and $XLLI = RQ_{10} \cdot \overline{LEV}_0 + RQ_{11} \cdot \overline{LEV}_1 + RQ_{12} + RQ_{13}$ Gates 220–228 in FIG. 3*a* make the decisions for execution of interrupts and handle resetting of interrupts. Upon interrupt termination, interrupts are reset by certain forms of the branch microinstructions. Gates 220 and 228 sense these reset conditions in accordance with the inputs from the control store output register 145, FIG. 2: $RESI = ROR_{20} \cdot \overline{ROR}_{21} \cdot ROR_{22} \cdot DIAV$, where $DIAV = \overline{ROR}_{16} \cdot \overline{ROR}_{17} \cdot \overline{ROR}_{18} \cdot \overline{ROR}_{19}$, from branch decoder 147. The particular interrupt level in progress is represented by the states of flip-flops 231, 235 and 240. The FINT flip-flop 243 is provided for initiating an interrupt service. When a hardware error interrupt occurs, due to a parity error for example, XEI = 1 and gates 225–227 enable the interrupt with the signal DINT = 1 when an odd microinstruction is in execution and no error interrupt is in process. The EIIP flip-flop 231 and the FINT flip-flop 243 are then set when clocked by the QEXEC pulse (FIG. 6). The J inputs of these flip-flops respectively receive $DINT \cdot XEI$ and DINT, the former being provided by gates 229 and 230. More broadly: $DINT = LDO \cdot (XEI + [\overline{DIM} \cdot \overline{FINT} \cdot \overline{INH} \cdot (RESI + HLIP) \cdot XHLI + \overline{LLIP} \cdot \overline{HLIP} \cdot XLLI]) \cdot \overline{EIIP}$ where LDO represents an odd microinstruction in execution, DIM represents a microinstruction in execution which cannot be interrupted, a memory cycle microinstruction in execution or interrupt mechanism microinstruction in execution, FINT indicates an interrupt service has been initiated, INH represents a programmed interrupt inhibit condition, EIIP represents an error interrupt in progress.

The high level interrupt in progress, HLIP, and low level interrupt in progress, LLIP, flip-flops are respectively set by $DINT \cdot \overline{XEI} \cdot XHLI$ and $DINT \cdot \overline{XEI} \cdot XLLI$. These flip-flops are respectively reset by $RESI \cdot \overline{EIIP} \cdot \overline{JHLIP}$ and $RESI \cdot \overline{EIIP} \cdot \overline{HLIP}$ where JHLIP is the J input to the HLIP flip-flop. The FINT flip-flop resets itself, after a microinstruction cycle.

An interrupt mechanism decoder 245 (FIG. 3*b*) is provided which is responsive to bits $ROR_{4-7}$ from the control store output register 144 (FIG. 2). This binary to one-of-ten converter enables the selection of specific registers and flip-flops for the interrupt mechanism microinstructions to operate upon. The converter outputs are in inverted form and gates 246–255 provide true outputs $IM_{0-9}$. ZPTR flip-flop 290 and the FPTR flip-flop 272 are bistable pointer elements of major importance. These flip-flops determine which of the two sets of working registers is to be used for a microinstruction routine or a microinstruction. The primary or normal pointer is ZPTR, is program controlled, and the FPTR pointer tracks the ZPTR pointer unless it is desirable to point to the alternate, non-current, set of working registers. The ZPTR flip-flop is set by $JZPTR = FPTR \cdot IM_9 + IM_2 \cdot ROR_{11} + IM_8 \cdot \overline{ZPTR}$ and reset by $\overline{FPTR} \cdot IM_9 + IM_2 \cdot ROR_{11} + IM_8 \cdot ZPTR$. These relationships are provided by NAND gates 282–289. The ZPTR flip-flop is clocked by QEXEC (FIG. 6).

There are three conditions under which the FPTR flip-flop state can be changed, that is, the output LOPT of gate 258 being a one. The first condition is when the interrupt level is reset while a high or low level interrupt is in progress and there is no hardware error interrupt request. $RESI \cdot (HLIP + LLIP) \cdot \overline{XEI}$ then causes the output of NAND gate 262 to be zero. The second condition is when an interrupt service is initiated and there is no hardware error interrupt. $DINT \cdot \overline{XEI}$ then causes the output of gate 263 to be a zero. The third condition is an execution of a change interrupt mechanism microinstruction selecting the FPTR flip-flop. $CIM \cdot (IM_8 + IM_2)$ then causes the output of gate 264 to be a zero. When FPTR flip-flop is subject to change, the output of gate 281, DPTR determines the new state.

There are four conditions under which the state of FPTR flip-flop is set or reset. The first condition is when an interrupt is started and either the ZPTR flip-flop is reset and the interrupt request is low level or there is a dual mode operation and port 1 requests a high level interrupt. A second condition is when an interrupt service is terminated with an interrupt level reset from a high level interrupt in process, without an interrupt initiated and either the ZPTR flip-flop is set or a low level interrupt is in process, but not both. The third condition is when an interrupt level is reset with no high level interrupt and no interrupt initiation but the ZPTR flip-flop is set. The fourth condition is when a change interrupt mechanism sets the ZPTR flip-flop. That is:

$$DPTR = DINT \cdot (\overline{ZPTR} \cdot XLLI + DUAL \cdot RQ_{11} \cdot XHLI) \quad 1$$

$$+ RESI \cdot HLIP \cdot \overline{DINT} \cdot (ZPTR \cdot \overline{LLIP} + \overline{ZPTR} \cdot LLIP) \quad 2$$

$$+ RESI \cdot \overline{HLIP} \cdot \overline{DINT} \cdot ZPTR \quad 3$$

$$+ CIM \cdot JZPTR \quad 4$$

The FPTR flip-flop is set by $DPTR \cdot LOPT$ and reset by $\overline{DPTR} \cdot LOPT$, using NAND gates 258–269 and 273–281. Three additional control flip-flops 304–306 are provided with the logic provided by gates 292–303. INH flip-flop 304 is set by $IM_0 \cdot ROR_{11}$ and reset by $IM_0 \cdot \overline{ROR}_{11}$. INHG is set by $IM_1 \cdot ROR_{11}$ and reset by $IM_1 \cdot \overline{ROR}_{11}$. DUAL flip-flop 306 is set by $IM_7 \cdot ROR_{11}$ and reset by $IM_7 \cdot \overline{ROR}_{11}$. These flip-flops 304–306 and ZPTR flip-flop 290 are clocked by $QCIM = QRAW \cdot CIM \cdot EXEC$, using gates 307 and 308.

In FIG. 4, the controller register 123 is shown as comprised of J-K flip-flops 380–387 which are set by the data-bus-out, $DBO_{8-15}$ from FIG. 2. These signals are inverted by gates 388–393, 323 and 322, respectively and applied to the K inputs of flip-flops 380–387. The controller register 123 is clocked by gates 376–378 such that $DAC = QRAW \cdot EXEC \cdot (\overline{LIM} + \overline{IM}_1)$.

The controller adaptor number registers are the J-K flip-flops 363–366, shown in FIG. 4, having a pair for each of the two sets of working registers. In general, these flip-flops are set and reset by initiation of an interrupt service or the execution of a load interrupt mechanism microinstruction. The ANOO flip-flop 363 is set by $(\overline{RQ}_{12} \cdot \overline{RQ}_{13}) \cdot (DINT \cdot \overline{DPTR} \cdot \overline{XEI}) + DBO_{14} \cdot (IM_2 \cdot \overline{FPTR} \cdot LIM)$ and reset by $(RQ_{12} + RQ_{13}) \cdot (DINT \cdot \overline{DPTR} \cdot \overline{XEI} + \overline{DBO}_{14} \cdot (IM_2 \cdot \overline{FPTR} \cdot LIM)$. AN01 is set by $(\overline{RQ}_{11} \cdot RQ_{13}) \cdot (DINT \cdot \overline{DPTR} \cdot \overline{XEI}) + DBO_{15} \cdot (IM_2 \cdot \overline{FPTR} \cdot LIM)$ and reset by $(RQ_{11} + RQ_{13}) \cdot (DINT \cdot \overline{DPTR \cdot XEI}) + DBO_{15} \cdot (IM_2 \cdot \overline{FPTR} \cdot LIM)$. AN10 is set by $(RQ_{12} \cdot RQ_{13}) \cdot (DINT \cdot DPTR \cdot \overline{XEI}) + DBO_{14} \cdot (IM_2 \cdot FPTR \cdot LIM)$ and reset by $(\overline{RQ}_{12} + \overline{RQ}_{13}) \cdot (DINT \cdot DPTR \cdot \overline{XEI}) + \overline{DBO}_{14} \cdot (IM_2 \cdot FPTR \cdot LIM)$. AN11 is set by $(\overline{RQ}_{11} \cdot RQ_{13}) \cdot (DINT \cdot DPTR \cdot \overline{XEI}) + DBO_{15} \cdot (IM_2 \cdot FPTR \cdot LIM)$ and reset by $(RQ_{11} + RQ_{13}) \cdot (DINT \cdot DPTR \cdot XEI) + \overline{DBO}_{15} \cdot (IM_2 \cdot FPTR \cdot LIM)$. These relationships are implemented with gates 310–323 and 331–362. The output signals are $DAN_0 = FPTR \cdot AN10 + \overline{FPTR} \cdot AN00$ and $DAN_1 = FPTR \cdot AN11 + \overline{FPTR} \cdot AN01$. Accordingly, the FPTR flip-flop of FIG. 3 selects which pair of flip-flops is effective at a given time for designating an I/O port, i.e., the adaptor number selection. This arrangement is representative of the manner in which a selection is made between the two sets of working registers.

The indirect segment branch microinstruction, having the format shown in FIG. 5, is one of the branch microinstructions which supports the interrupt reset function. When the microinstruction is executed, a branch is made to the even address specified by bits 24–30 within the current 256 word segment. If bit 22 is a one, the interrupt level is reset. When this microinstruction terminates an interrupt service, the service routine informs the current adaptor so that the corresponding interrupt request signal is reset, i.e., RESI = 1. If the terminating interrupt is a high level interrupt which interrupted a low level interrupt, the adaptor port for the interrupted low level interrupt still has an $I_n$ interrupt request active. Accordingly, the appropriate adaptor number previously loaded into the non-current portion of register 121 is effective again and the low level interrupt is resumed. The next address is taken from INTAR register 129.

The vector segment branch microinstruction, having the format shown in FIG. 5, has, as one of its uses, the capability for testing for an event notification from an I/O post. Another use is to respond to particular conditions in the non-current branch test register. When this branch microinstruction is executed, a branch is taken to a location within the current 256 word segment as specified by the seven bit even address field, bits 8–14, modified in accordance with the split field $n_{0-2}$, bits 6, 7 and 15. The modification consists of substituting two or four bits for the least significant two or four bits of the address bits taken from the control store output register 145, $ROR_{29-30}$ or $ROR_{27-30}$. Accordingly, one of the inputs to $A_1$ switch, FIG. 2, for addressing control store 50, is the output of vector segment branch V switch 109. The inputs to this switch are various combinations of bits from the branch test register 106 of both sets of working registers and from gates 395 and 396 in FIG. **4*b*. The latter bits represent the presence of an event notification, $IMS_1$, and the most significant bit from the interval timer 122, $IMS_0$. $IMS_0$ and $IMS_1$ can be inhibited by INHG from flip-flop 305, FIG. 3*b*,** under program control. Because the resulting control store addresses reflect the states of the selected input bits, this arrangement enables a rapid and efficient programmable test of the branch test registers and the adaptor interface. The capability of branching on a non-current branch test register enables communication between programs using the current and non-current sets of working registers without requiring the use of read/write memory. The test of the adaptor interface reduces the programming overhead for servicing event notifications. Because these events are intended to be of low priority, it is important that they be detected and serviced readily without significant program execution time being required to scan for them.

However, the most common mode of accessing non-current working registers is to execute a CIM microinstruction to change the state of FPTR flip-flop 272.

The operation of the interrupt logic of FIGS. 3 and 4 is now summarized. If no interrupts are being processed, the EIIP, HLIP, LLIP and FINT flip-flops are reset. If all the bits of the adaptor control register 123 are reset except for the first, $LEV_0$, none of the interrupts $I_{0-3}$ will be masked. Also, port 2 will be specified as associated with control adaptor ports 0 and 1, and only an $I_0$ interrupt from port 0 will be high level. If an $I_1$ interrupt from port 1 is received, the $RQ_{11}$ output of gate 207 will be zero because all its inputs are ones, assuming a DAI microinstruction is not in execution. If any one of $ROR_{0-2}$ bits is a zero, the output of gate 205 will be a one. If $I_0 = 0$, then $\overline{RQ}_{10} = 1$, and $\overline{MSK}_1 = 1$ because of the assumed initial condition of control register 123. Also, the output of gate 215, XLLI, is one and causes a positive decision for an interrupt, DINT = 1, when an odd microinstruction is being executed, ($\overline{LDO} = 1$), no conflicting microinstructions in execution ($\overline{DIM} = 1$) and the INH flip-flop has not been set. Then the outputs of gates 223, 224 and 226 are all ones. Accordingly, LLIP and FINT flip-flops are set through gates 238 and 239, indicating that a low level interrupt is in process.

The normal ZPTR flip-flop 290 is generally in a reset state. For example, a CIM type of microinstruction with $ROR_{4-7} = 0010$ is decoded by the binary to one-of-ten converter 245 in conjunction with $ROR_{11} = 0$ resets the ZPTR flip-flop by means of gates 286 and 287 when clocked by $QCIM = CIM \cdot QRAW \cdot EXEC$. With a low level interrupt, $XLLI \cdot \overline{ZPTR}$ causes DPTR = 1 through gates 273, 275, 276 and 281. Therefore, when the low level interrupt is initiated, gates 258, 263 and 265–269 set FPTR flip-flop 272. Also, with the start of an interrupt, the control address register contents are saved in the INTAR register 129 (FIG. 2) and a branch is made to the hard-wired address in $A_0$ and $A_1$ switches 134 and 135. Alternatively, the new address can be obtained from the AUXAR register, if specified by the adaptor interface by the interrupt definer line. Lastly, the adaptor number is loaded into the controller adaptor number register 121 (FIG. 4). Gates 316, 318, 319, 343, 353 and 361 cause AN11 flip-flop 366 to be set in response to $\overline{XEI}$, DPTR and $\overline{RQ}_{11}$. This causes $DAN_1 = 1$ by gates 369, 370, 373 and 374.

If an interrupt should be received from port 0, while a low level interrupt is being processed, it will be treated as a high level interrupt because the $LEV_0$ flip-flop 380 in control register 123 is set. In a manner similar to the low level interrupt described, this interrupt causes $\overline{RQ}_{10} = 0$, XHLI = 1 and DINT = 1. Also, the FINT flip-flop 243 and HLIP flip-flop 235 are set. The FPTR flip-flop 272 is reset because DPTR = 0. It should be noted that for dual channel operation, with interrupts from controller adaptors 0 and 1 both high level, and with DUAL flip-flop 306 set, then an interrupt from controller adaptor 1 will cause the FPTR flip-flop to be set, because DPTR = 1, through gates 274–276 and 281. With an ordinary high level interrupt from adaptor port 0, FPTR = 0, DPTR = 0 and $\overline{RQ}_{11} = \overline{RQ}_{12} = \overline{RQ}_{13} = 1$, so that AN00 flip-flop 363 and AN01 flip-flop 364 are reset. Accordingly, the outputs of the adaptor number register, $DAN_0$ and $DAN_1$ are both zero.

As shown in FIG. 9, the start memory cycle definer microinstruction format has 0001 in the four most significant bits. A write cycle is specified by a 1 in the least significant bit and a read cycle is specified by a 1 in the next to least significant bit. The source of the main memory data address is specified by the register designation in bits 4–8.

The adaptor service microinstruction has 111 in the three most significant bits. The fourth bit specifies normal operation if its value is zero or enables high speed transfer if its value is one. For normal operation, the adaptor port selected for service is specified by the adaptor number register 121. For high speed data transfer operation, a link adaptor port is selected by adaptor control register 123 in combination with adaptor number register 121, and in addition an auxiliary controller, adaptor selection is made. The last eight bits of the microinstruction contain a literal which is applied to the address/control lines of the adaptor interface and the resulting signals define the service operation functions in accordance with particular subsystem requirements. For high speed data transfers the direction of the transfer is specified by this literal. A one in the fifth bit indicates that no response in signal is required on the adaptor interface. A one in the sixth bit specifies that the status line signals of the adaptor interface are loaded into the lower order half of the branch test register 106. The seventh and eighth bits specify that the A and B portions, respectively, of the AB accumulator 105 are loaded with the contents of the data-in lines of the adaptor interface.

FIG. 7 shows the logic for adaptor port selection when a device port is selected for service. The outputs $\overline{SEL}_{0-3}$ of gates 403–406 represent the selection of respective adaptor ports 0–3, in complement form. All of the gate outputs $\overline{SEL}_{0-3}$ are a function of the execution of an adaptor service microinstruction being in execution. Accordingly, the first three bits of the control store output register 144 (FIG. 2) are tested by gates 201 and 202 so that $DAI = ROR_0 \cdot ROR_1 \cdot ROR_2$. Port 0 is selected if and only if the adaptor number register contains the adaptor number zero and the adaptor service instruction specifies an adaptor service which is not a high speed transfer ($ROR_3 = 0$). That is:

$$SEL_0 = DAI \cdot \overline{DAN_0} \cdot \overline{DAN_1} \cdot \overline{ROR_3}$$

Similarly, for the second port:

$$SEL_1 = DAI \cdot \overline{DAN_0} \cdot DAN_1 \cdot \overline{ROR_3}$$

For the link adaptor selection, the logic is more complex because in addition to selecting a normal adaptor function ($ROR_3 = 0$), the logic must support a second adaptor selection so that data can be transferred across two adaptor ports during the execution of a single adaptor interface service microinstruction. Accordingly, the logic for the third adaptor port is:

$$SEL_2 = DAI[DAN_0 \cdot \overline{DAN_1} \cdot \overline{ROR_3} + \overline{DAN_0} \cdot ROR_3(DAN_1 \cdot \overline{LA_0} + \overline{DAN_1} \cdot \overline{LA_1})]$$

The first term includes the adaptor number explicitly, $\overline{DAN_0} \cdot DAN_1$, from the adaptor number register 121. The second term is a function of the control register 123 state in respect to the previously set flip-flops 382 and 383 which associate link adaptor ports with the device adaptor ports. The fourth adaptor port is selected in an equivalent manner:

$$SEL_3 = DAI[DAN_0(DAN_1 + ROR_3) + ROR_3(\overline{DAN_1} \cdot \overline{LA_0} + DAN_1 \cdot \overline{LA})]$$

Additional gates 423–426 in FIG. 7 enable a flexible dialogue for concurrent data transfers across the adaptor interface. Gates 423 and 424 respectively produce $\overline{DHLIP_0}$ and $\overline{DHLIP_1}$, where $DHLIP_0 = \overline{DAN_1} \cdot HLIP$ and $DHLIP_1 = DAN_1 \cdot HLIP$. Gates 425 and 426 respectively produce $\overline{DSEL_0}$ and $\overline{DSEL_1}$, where $DSEL_0 = \overline{DAN_0} \cdot \overline{DAN_1} \cdot ROR_3 \cdot DAI$ and $DSEL_1 = \overline{DAN_0} \cdot DAN_1 \cdot ROR_3 \cdot DAI$ with these signals, together with the signals from control register 123 (FIG. 2).

The signals generated by the FIG. 7 logic, together with the link adaptor assignments, $LA_0$ and $LA_1$, by register 123 (FIG. 4) enable high speed data transfers with the execution of an adaptor interface service instruction. The fourth bit, $ROR_3$, in such instructions, is a logical one. For example, the data transfer is preceded by an interrupt ($I_0$ or $I_1$) or load interrupt mechanism instruction which sets the adaptor number register to the desired controller adaptor port number so that $DAN_0 = 0$ and $DAN_1 = 0$ or 1. The execution of the adaptor interface instruction causes the contents of the AB accumulator register to be transferred over the data-bus-out lines. The direction of the data transfer is specified by the literal field of the microinstruction which is interpreted by one adaptor port as a read command and which is interpreted by the other adaptor port as a write command. During the same microinstruction cycle, the contents of the data-bus-in are loaded into the AB accumulator, at the trailing edge of the EXEC clock pulse. The link adaptor is determined by the control signals $LA_0$ and $LA_1$ and the adaptor number register 121. Optionally, if the adapter interface microinstruction is preceded by a start read memory cycle microinstruction, the original contents of memory 10 are stored in the AB accumulator 105 (FIG. 2). A line, such as 127 (FIG. 1) between the controller adaptor 120 and the link adaptor 130 provides the capability for returning a response in (RPI) to the controller. If the adaptor interface microinstruction is immediately preceded by a start write memory cycle microinstruction, the additional function of storing the AB accumulator contents into read/write main memory is performed.

An alternative fast transfer mode of operation is from main memory to an adaptor port. This requires a main memory cycle but no more. It is initiated by a start read memory cycle microinstruction followed by an adaptor interface service microinstruction. During the latter, the contents are transferred from the AB accumulator over the data-out-bus to an adaptor port and the contents of the AB accumulator are replaced by the data from main memory. As shown in FIG. 8, for each port, adaptor $n = 0, 1, 2$, and 3, there are input lines to the controller for interrupts ($I_n$), event notification ($EN_n$) and response in (RPI). For the first two ports, $n = 0, 1$, there are high level interrupts definers ($HLI_n$). There are also individual port adaptor output lines, select ($SEL_n$), initialize and execution clock definer (EXEC). For the first two ports, $n = 0, 1$, there are output lines for link adaptor definers ($LA_n$), link adaptor selected ($DSEL_n$ ) and high level interrupt in progress ($DHLIP_n$). A common raw clock (QRAW) is also provided.

It is understood that the invention should not be construed as being limited to the form of embodiment described and shown herein as many modifications may be made by those skilled in the art without departing from the scope of the invention.

What is claimed is:

1. A controller intermediate a central processor and a peripheral device having a data storage register from and to which device data is transferred through adaptor ports between the processor and controller and between the controller and the device during the same operation cycle, said controller including a plurality of device adaptor ports providing an interface for peripheral devices and a plurality of link adaptor ports for providing an interface for a central processor, comprising A. an interface bus connected to all adaptor, ports having portions for input and output data transfer connected to said controller data storage register;

B. an adaptor number register for selecting an adaptor port for data transfer;

C. a control register for associating a link adaptor port with a controller adaptor port;

D. first selection logic means responsive to said adaptor number register for selecting an device adaptor port for data transfer on said interface bus;

E. second selection logic means responsive to said adaptor number register and said control register for selecting a link adaptor port for data transfer on said interface bus.

2. The apparatus of claim 1, further comprising:

F. a read/write memory, connected to said interface bus, for selectively receiving data.

3. The apparatus of claim 1, further comprising:

F. interconnection means, connecting a link adaptor port and a device adaptor port, for enabling a response-in signal from the device adaptor through the link adaptor port to indicate that a data transfer has been successful.

4. In a programmed peripheral controller responsive to adaptor service requests, apparatus for enabling data transfers between a pair of adaptor ports during a single instruction cycle, said controller including a plurality of link adaptor ports and a plurality of controller adaptor ports, comprising:

A. a pair of bistable controller register elements for associating a pair of link adaptor ports with a pair of controller adaptor ports in accordance with the respective states of said pair of bistable register elements;

B. an accumulator register;

C. an input switch for selectively loading said accumulator;

D. a common input data bus connected to said input switch and connected to all adaptor ports;

E. a common output data bus connected to all adaptor ports;

F. an output switch selectively connecting said accumulator to said output data bus;

G. a pair of bistable adaptor number register elements;

H. interrupt logic for selectively setting said pair of bistable adaptor number register elements;

I. a control store output register for receiving controller adaptor service requests;

J. primary adaptor port selection logic, responsive to said pair of bistable controller register elements and to said pair of bistable number register elements;

K. auxiliary adaptor port selection logic, responsive to pair of bistable controller register elements, to said pair of bistable number register elements, and to said control store output register.

5. The apparatus of claim 4, further comprising:

L. a read/write memory, connected to said interface bus, for selectively receiving data.

6. The apparatus of claim 4, further comprising:

L. interconnection means, connecting a link adaptor port and a controller adaptor port, for enabling a response-in signal from the controller adaptor through the link adaptor port to indicate that a data transfer has been successful.

* * * * *